United States Patent [19]
Kawado et al.

[11] Patent Number: 5,271,966
[45] Date of Patent: Dec. 21, 1993

[54] METHOD FOR MANUFACTURING A MAGNETIC RECORDING MEDIUM

[75] Inventors: Yasuhumi Kawado, Yamaguchi; Tsutomu Shimizu; Jiro Kondo, both of Hiroshima, all of Japan

[73] Assignee: Mazda Motor Corporation, Hiroshima, Japan

[21] Appl. No.: 852,959

[22] Filed: Mar. 17, 1992

[30] Foreign Application Priority Data

Mar. 29, 1991 [JP] Japan ................. 3-065842

[51] Int. Cl.$^5$ ........................................ H01F 10/02
[52] U.S. Cl. ................... 427/453; 427/128; 427/576
[58] Field of Search ............. 427/453, 128–132, 427/599, 576

[56] References Cited

U.S. PATENT DOCUMENTS 3,576,672 4/1971 Harris et al. ............... 427/453

FOREIGN PATENT DOCUMENTS 61-53504 3/1986 Japan .

Primary Examiner—Bernard Pianalto
Attorney, Agent, or Firm—Sixbey, Friedman, Leedom & Ferguson

[57] ABSTRACT

A magnetic film for recording a magnetic signal is formed on a surface of a base piece. The magnetic film contains $Fe_3O_4$ of at least 30 wt %, preferably at least 75 wt %. For forming the magnetic film, a plasma spraying method is employed, in which an iron oxide (FeOx) is used for a thermal spraying powder, and a non-reducing gas is used as a working medium for the plasma spraying.

6 Claims, 6 Drawing Sheets

Recorded Signal A

Recorded Signal B

Recorded Signal A

Recorded Signal B

Phase Difference Signal coercive force (Oe)

$Fe_3O_4$ (%)

saturation magnetization (emu/cc)

$Fe_3O_4$ (%)

METHOD FOR MANUFACTURING A MAGNETIC RECORDING MEDIUM

BACKGROUND OF THE INVENTION

The present invention relates to a magnetic recording medium and method for manufacturing the same.

Lately, there has been a remarkable advancement in a field of mechatoronics of automobiles, machine tools, and the like. Especially in the field of mechatronics of automobiles, it has been desired to develop a technique for measuring a torque of a shaft member used for various parts of the automobile, a rotating speed, or rotating angle of the shaft member with high precision.

There is known a method for detecting a torque of the shaft member, utilizing a magnetic characteristic of a magnetic film which is formed on the shaft member. For example, a magnetoristriction method (a stress - magnetic moment effect) of the film is utilized for detecting the torque. In this method, the precision of detected torque is affected by the magnetic characteristic of the film. Namely, the characteristic of the magnetic film changes when a temperature changes or time passes. Consequently, the magnetostriction method has not been fully put to practical use.

On the other hand, the torque detecting method based on a torsional angle of the shaft member is also known. In this method, a magnetic signal of rectangular pulse is recorded by a magnetic recording head to the magnetic film formed on a surface of the shaft member. Then, the magnetic signal is regenerated by a magnetic signal regenerating head so as to obtain the torsional angle of the shaft member. And the torque of the shaft member is calculated based on the torsional angle.

There is known a method for manufacturing a magnetic scale of an encoder for detecting a rotating speed, by spraying a molten magnetic material on a surface of a base piece to form a magnetic film (refer to Japanese Patent Application Laying Open Gazette No. 61-53504).

In order to put the magnetic recording medium to practical use, a magnetic characteristic of the magnetic film becomes an essential key when using a head for recording and regenerating the signal to the magnetic film in the torque detecting method based on the torsional angle.

Namely, when a coercive force of the magnetic film is high, it is difficult to record the magnetic signal, the head is damaged by a heat, and its durability is lowered because an output of the head is required to be raised. On the other hand, if the coercive force is low, the recorded magnetic signal is easily erased. This leads to a lowering of a regenerated output. If a saturation magnetization or a residual magnetization of the magnetic film is raised, the regenerated output can be raised and if the saturation magnetization and the residual magnetization are lowered, a recording frequency for the magnetic signal can not be increased.

SUMMARY OF THE INVENTION

It is an object of the present invention to provide a magnetic recording medium having a magnetic film which can enhance a regenerated output without damaging a recording characteristic of a magnetic signal.

It is another object to provide a magnetic recording medium having a magnetic film which is easily manufactured with low cost.

It is a further object to provide a method for manufacturing the magnetic recording medium.

To achieve the above objects, $Fe_3O_4$ is used for the magnetic film. A plasma spraying method is used for forming the magnetic film which contains the $Fe_3O_4$. In this case, a content ratio of $Fe_3O_4$ can be increased by adjusting a working medium.

In the present invention, the film for recording a magnetic signal is formed on a surface of the base piece of the magnetic recording medium, and the film contains at least 30 wt % of $Fe_3O_4$.

$Fe_3O_4$ is used because it is a stable element physically and chemically, so that it is durable under a severe condition such as a torque detection, and an expected magnetic characteristic is easily obtained by adjusting an amount of the element. In this case, an element besides $Fe_3O_4$ in the film may be FeO or some other kind. Because of low price of $Fe_3O_4$ as a magnetic element, the magnetic film, as a whole, can be manufactured with low cost.

By setting a content ratio of $Fe_3O_4$ in the magnetic film to at least 30 wt %, a coercive force can be restrained, so that the magnetic signal can be recorded with a low output, and a saturation magnetization and residual magnetization are secured so as to increase a regenerated output. Namely, if the content ratio of $Fe_3O_4$ is less than 30 wt %, the coercive force tends to become excessively high, so that the output for recording the magnetic signal needs to be increased, while an expected regenerated output can not be obtained because the saturation magnetization and the residual magnetization are lowered. Further, if the content ratio of the $Fe_3O_4$ is at least 75 wt %, the coercive force is lowered properly and there can be obtained an advantage in recording capability, while the coercive force is not lowered excessively, the regenerated output is enhanced by a increase of the saturation magnetization and the residual magnetization, and a threshold recording frequency can be raised.

In this case, in the magnetic characteristic of the magnetic film, it is preferred that the coercive force is 50–450 (Oe), the saturation magnetization is 100–650 (emu/cc), the residual magnetization is 40–250 (emu), and it is more preferred that the coercive force is 100–350 (Oe), the saturation magnetization is 90–550 (emu/cc), and the residual magnetization is 70–200 (emu/cc).

In this invention, the base piece may be made of either a magnetic or a non-magnetic material. In case of using a magnetic material for a base piece, it is preferred to coat with a non-magnetic film under the magnetic film for avoiding a magnetic flux leakage to the base piece side.

In the method for manufacturing the magnetic recording medium, a plasma spraying method is used, wherein a magnetic film for recording a magnetic signal is formed on a surface of the base piece by spraying a material on the surface of the base piece by means of a plasma jet.

An iron oxide powder is used as the spraying powder for the plasma spraying, and a non-reducing a gas is used as a working medium.

In the method for manufacturing the magnetic recording medium, as the iron oxide powder which is a material for the plasma spraying, $Fe_3O_4$ powder, $Fe_2O_3$ powder, a mixture of $Fe_3O_4$ powder and FeO powder, or a mixture of $Fe_3O_4$ powder, FeO powder and $Fe_2O_3$ powder may be used. A non-reducing gas is used as the working medium so as to increase the amount of $Fe_3O_4$ in the magnetic film.

Conventionally, as the working medium, Ar or $N_2$ is used as a primary gas, and He or $H_2$ is used as a secondary gas. However, if a reducing gas such as $H_2$ is used, there is raised a problem such that $Fe_3O_4$ is reduced to be FeO in a plasma flame and the amount of $Fe_3O_4$ is decreased. Therefore, in the invention, the $H_2$ is not used, but non-reducing gas, Ar or $N_2$ is used as a working medium.

As an output of the plasma spraying, about 30-48 KW is preferable. If the output is less than 30 KW, the film can not be formed evenly with a high density, and if the output exceeds 48 KW, a nozzle of a plasma torch is melted or a durability of the nozzle is lowered.

Features and advantages of the invention will be more apparent by an embodiment with reference to accompanying drawings.

BRIEF DESCRIPTION OF THE DRAWING

The accompanying drawings show a preferred embodiment of the present invention.

DESCRIPTION OF THE PREFERRED EMBODIMENT

Figure 1:
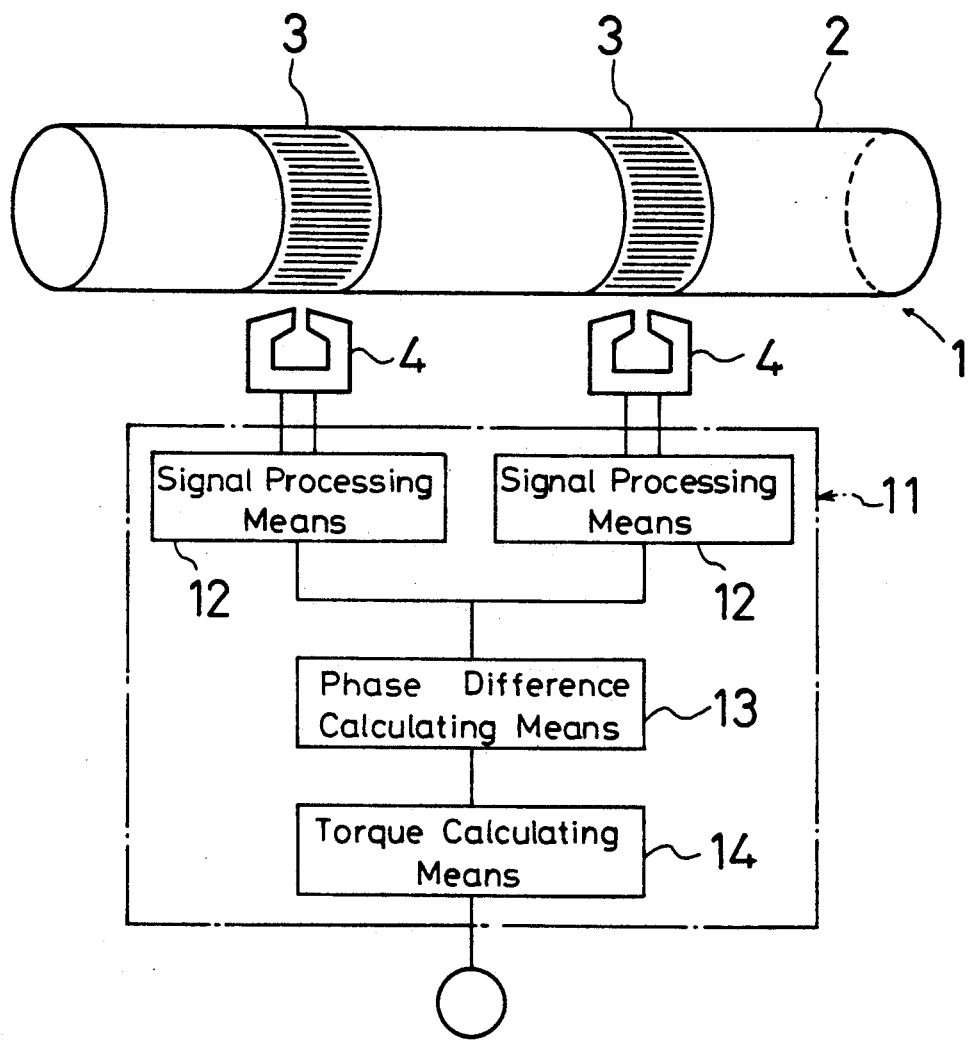
FIG. 1 is a drawing of a torque sensor.
Figure 2:
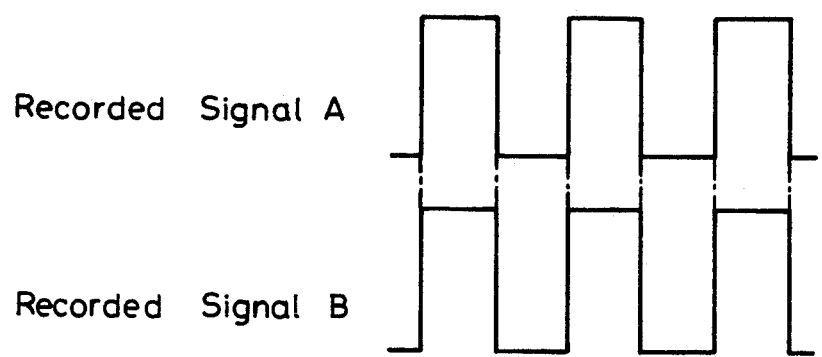
FIG. 2 is a drawing of a pair of magnetic signals recorded on a magnetic film with both phases conformed to each other.

In FIG. 1, a reference numeral 1 designates a magnetic recording medium. A reference numeral 2 designates an aluminum turbine shaft (a base piece) provided in a torque converter (not shown in the drawing). Reference numerals 3 is a ring shaped magnetic film with a thickness of 100 μm, arranged with a predetermined space left therebetween on the circumferential surface of the turbine shaft 2.

Writing of a magnetic signal to the magnetic films 3 is conducted as follows. A turbine shaft 2 is rotated at the speed of 600 rpm and pulse signals with each phase conformed (recorded signal A and B) are written to each overall surface of the magnetic films 3 circumferentially at 15 V by a pair of magnetic signal recording heads (not shown in the drawing) which contact with the magnetic films 3.

Decoding of the magnetic signals from the magnetic films is conducted as follows.

As shown in FIG. 1, a pair of magnetic signal decoding heads 4 are respectively opposed to the respective magnetic films 3 in stead of the above magnetic signal recording heads.

Figure 3:
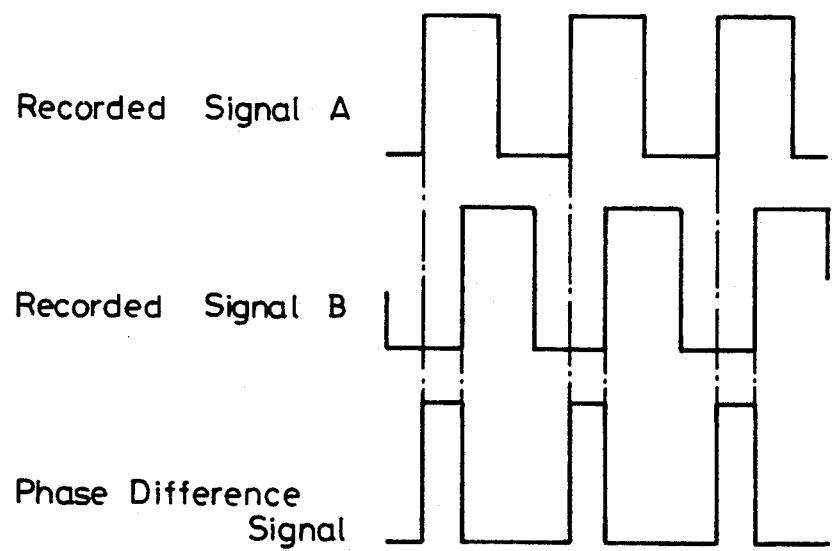
FIG. 3 is a drawing showing a pair of regenerated signals and a phase difference (phase shift) therebetween.

When a torque is applied to the turbine shaft 2, a phase difference (phase shift) between signals A and B detected by a pair of magnetic signal decoding heads 4 occurs as shown in FIG. 3. The signals A and B are processed by each signal processing means 12 in a signal processing part 11. Then, the phase difference between two magnetic signal decoding heads 4 (namely, between two magnetic films 3) is calculated by a phase difference calculating means 13. Thereafter, a torque corresponding to the phase difference is calculated by a torque calculating means 14 and the calculated torque is outputted outside the signal processing part 11 (ex. an automatic transmission controller).

More specific description will be made of the magnetic recording medium.

Plasma Spraying Device

Figure 4:
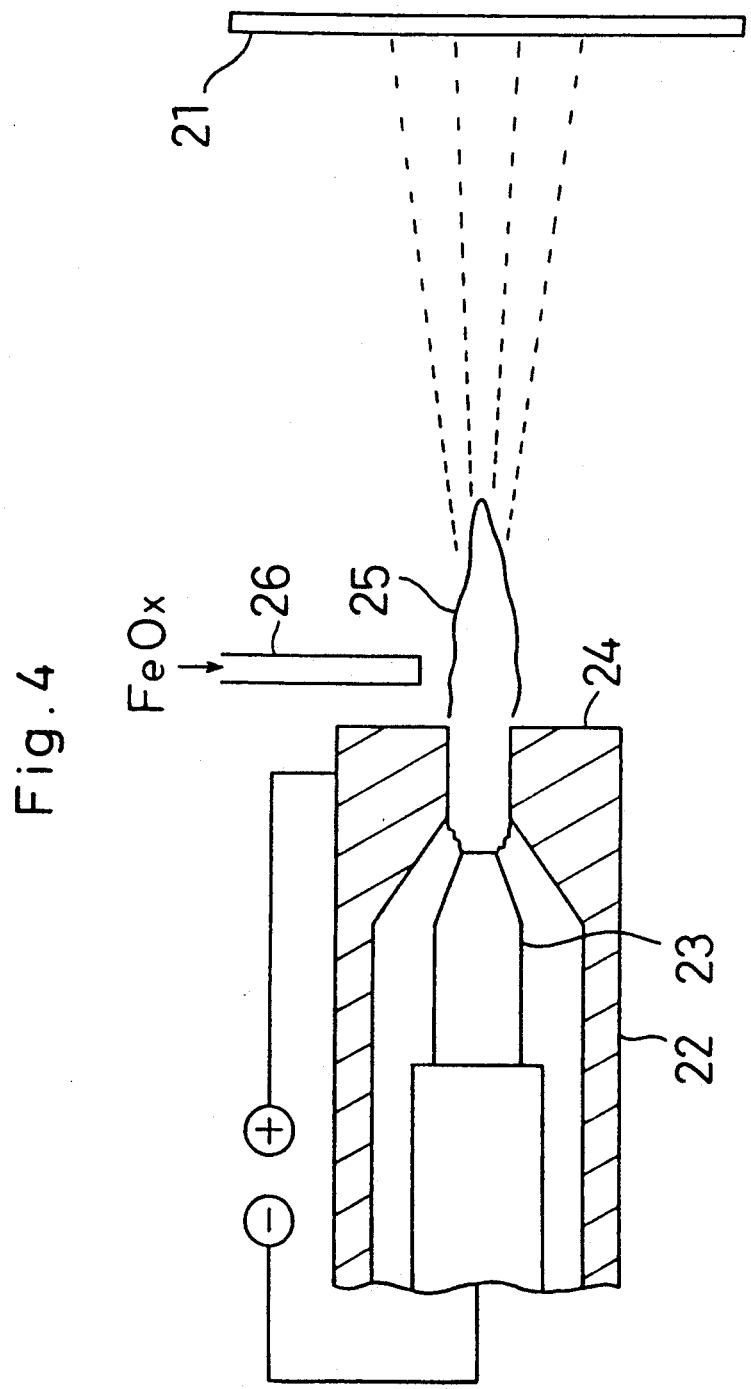
FIG. 4 is a sectional view showing a part of a plasma spraying device.

In FIG. 4, a part of a plasma spraying device for forming a magnetic film on a base piece 21 is shown (the base piece may be either a plate or a shaft). In FIG. 4, reference numeral 22 designates a plasma torch in which a negative electrode 23 is provided. A working medium is sent from around the negative electrode 23 to a nozzle 24. The working medium is heated by a direct arc generated between the negative electrode 23 and the nozzle 24 to be a plasma jet (a plasma flame) 25. The plasma jet 25 is blasted from the nozzle 24. A material supplying nozzle 26 for supplying iron oxide powder FeOx as a thermal spraying material to a plasma jet 25 is provided in front of the nozzle 24. Accordingly, a magnetic film formed by the plasma spraying device contains $Fe_3O_4$ as a magnetic material.

Sample Test

In tables 1-3, a composition (wt %), three magnetic characteristics, and a recording and regenerating characteristic of each sample are shown. In each sample, a magnetic film is formed by plasma spraying a thermal spraying material of a different size and kind, under a different thermal spraying conditions.

TABLE 1

| Sample | Thermal Spraying Powder Composition | Particle Size (μm) | Spraying Condition Gas/Output | $FeO/Fe_3O_4$ in Magnetic Film | Magnetic Characteristic Hc (Oe) | Ms (emu/cc) | Mr (emu/cc) | Recording Characteristic [Regenerated Output (V) at $10^3$ Hz] |
|---|---|---|---|---|---|---|---|---|
| A | $42FeO—8.6Fe_2O_3—49.4Fe_3O_4$ | 10-63 | Ar—$H_2$/34 kW | 60.8/39.2 | 403.6 | 145.4 | 59.2 | 8.0 |
| B | $50FeO—9.3Fe_2O_3—40.3Fe_3O_4$ | 10-45 | Ar—$H_2$/34 kW | 47.8/52.2 | 405.0 | 329.2 | 143.7 | 12.4 |
| C | $48.7FeO—9.8Fe_2O_3—41.6Fe_3O_4$ | 5-30 | Ar—$H_2$/34 kW | 17.0/83.0 | 280.0 | 431.5 | 178.6 | 27.8 |
| D | $30.9FeO—39.9Fe_2O_3—20.2Fe_3O_4$ | 10-63 | Ar—$H_2$/34 kW | 46.9/51.1 | 320.0 | 260.5 | 89.6 | 11.6 |
| E | $24.4FeO—49.3Fe_2O_3—26.3Fe_3O_4$ | 10-63 | Ar—$H_2$/34 kW | 45.9/54.1 | 280.0 | 291.3 | 106.9 | 14.1 |
| F | $12.9Feo—78Fe_2O_3—9.1Fe_3O_4$ | 10-63 | Ar—$H_2$/34 kW | 25/7/71.3 | 220.0 | 294.1 | 105.0 | 17.6 |
| G | $100Fe_2O_3$ | 10-63 | Ar—$H_2$/34 kW | 28.1/71.9 | 192.0 | 285.0 | 98.0 | — |
| H | $100Fe_3O_4$ | 10-63 | Ar—$H_2$/34 kW | 43.2/58.8 | 350.0 | 271.0 | 111.0 | 13.2 |

TABLE 1-continued

| Sample | Thermal Spraying Powder Composition | Particle Size (μm) | Spraying Condition Gas/Output | FeO/Fe3O4 in Magnetic Film | Magnetic Characteristic Hc (Oe) | Ms (emu/cc) | Mr (emu/cc) | Recording Characteristic [Regenerated Output (V) at $10^3$ Hz] |
|---|---|---|---|---|---|---|---|---|
| I | 100Fe3O4 | 10–45 | Ar—H2/34 kW | 45.8/54.2 | 291.0 | 201.0 | 78.1 | 23.5 |
| J | 100Fe3O4 | 5–30 | Ar—H2/34 kW | 45.5/54.5 | 258.0 | 175.0 | 66.1 | 11.77 |

TABLE 2

| Sample | Thermal Spraying Powder Composition | Particle Size (μm) | Spraying Condition Gas/Output | FeO/Fe3O4 in Magnetic Film | Magnetic Characteristic Hc (Oe) | Ms (emu/cc) | Mr (emu/cc) | Recording Characteristic [Regenerated Output (V) at $10^3$ Hz] |
|---|---|---|---|---|---|---|---|---|
| K | 42FeO—8.6Fe2O3—49.4Fe3O4 | 10–63 | Ar/32 kW | 34.3/65.7 | 333.9 | 286.6 | 115.4 | 17 |
| L | 48.7FeO—9.8Fe2O3—41.6Fe3O4 | 5–30 | Ar/32 kW | 46.9/53.1 | 370.0 | 283.1 | 119.7 | 9.8 |
| M | 48.7FeO—9.8Fe2O3—41.6Fe3O4 | 5–30 | Ar/32 kW | 40.3/59.7 | 335.1 | 375.7 | 148.1 | 27.2 |
| N | 30.9FeO—39.9Fe2O3—29.2Fe3O4 | 10–63 | Ar/32 kW | 37.1/62.9 | 290.0 | 302.1 | 114.9 | — |
| O | 24.4FeO—49.3Fe2O3—26.3Fe3O4 | 10–63 | Ar/32 kW | 19.0/81.0 | 300.0 | 386.2 | 154.2 | — |
| P | 12.9FeO—78Fe2O3—9.1Fe3O4 | 10–63 | Ar/32 kW | 24.7/75.3 | 250.0 | 501.0 | 176.4 | 23.3 |
| Q | 100Fe2O3 | 10–63 | Ar/32 kW | 20.6/79.4 | 260.0 | 351.0 | 138.0 | — |
| R | 100Fe3O4 | 10–63 | Ar/32 kW | 9.7/90.3 | 180.0 | 480.0 | 172.0 | 28.0 |
| S | 100Fe3O4 | 10–45 | Ar/32 kW | 8.1/91.9 | 175.0 | 304.0 | 114.0 | 33.13 |
| T | 100Fe3O4 | 5–30 | Ar/32 kW | 15.6/84.4 | 250.0 | 308.0 | 123.0 | 27.13 |

TABLE 3

| Sample Test | Thermal Spraying Powder Composition | Particle Size (μm) | Spraying Condition Gas/Output | FeO/Fe3O4 in Magnetic Film | Magnetic Characteristic Hc (Oe) | Ms (emu/cc) | Mr (emu/cc) | Recording Characteristic [Regenerated Output (V) at $10^3$ Hz] |
|---|---|---|---|---|---|---|---|---|
| U | 100Fe3O4 | 10–63 | Ar—H2/28 kW | — | No film formed | | | — |
| V | 100Fe3O4 | 10–63 | Ar—H2/40 kW | 39.0/61.0 | 270 | 200 | 110 | 14.2 |
| W | 100Fe2O3 | 10–63 | Ar—H2/28 kW | — | No film formed | | | — |
| X | 100Fe2O3 | 10–63 | Ar—H2/40 kW | 20.0/80.0 | 291 | 402.0 | 170.6 | 25.2 |
| Y | 100Fe3O4 | 10–63 | Ar/28 kW | — | Film sparsely formed | | | — |
| Z | 100Fe3O4 | 10–63 | Ar/49 | 2.2/97.8 | 160 | 500 | 175 | 35.2 |
| α | 100Fe2O3 | 10–63 | Ar/28 | — | Film sparsely formed | | | — |
| β | 100Fe2O3 | 10–63 | Ar/49 kW | 15.0/85.0 | 310 | 371 | 41 | 29.0 |

In each of the samples, an aluminum alloy plate with a length of 10 mm, width of 2 mm and thickness of 1 mm is used as a base piece in measuring the magnetic characteristics (coercive force Hc, saturation magnetization Ms, residual magnetization Mr). In this case, each magnetic film is formed on the aluminum with a thickness of 100–150 μm. Each of the characteristics is measured by a vibration type magnetometer.

In each of the samples, an aluminum alloy shaft member with a diameter of 30 mm is used as a base piece for measuring a recording and regenerating characteristic. In this case, a magnetic film with a thickness of 100–150 μm is formed on an overall surface of the shaft member circumferentially and the characteristic is measured under the following condition.

| Recording of a signal | |
|---|---|
| Head | Erasing head |
| (Clearance) | 0 mm |
| Magnetic signal generating means | Function generator |
| Recording output | 0.4 A |
| Regenerating of a signal | |
| Head | Erasing head, |
| (Clearance) | 0 mm |
| Amplifier | 50 × 10 times |
| Filter | 50–100 KHz |
| Rotating Speed of the shaft member | |
| 60 rpm (constant) | |

The composition of the magnetic film is analyzed by an X-ray diffraction instrument.

The magnetic characteristic and the regenerated output in each of the above samples are also shown in FIG. 5 through FIG. 8.

Consideration

Composition of a Magnetic Film (Influence of Material Powder)

A through F and K through P are samples of each powder of FeO-Fe2O3-Fe3O4. Comparing A with B, and comparing K through M one another, it is understood that a content ratio of FeO and Fe3O4 has little influence on a composition of a magnetic film. Comparing D through G one another and comparing N through Q one another, it is understood that when the amount of Fe2O3 is increased, the amount of Fe3O4 in the magnetic film tends to be increased. This is caused by a reduction of Fe2O3.

Influence of a Working Medium

In each of the samples H through J and R through T, the amount of Fe3O4 is 100 wt %. In H through J, a part of a working medium is a reducing gas H2. In R through T, a reducing gas is not used, namely a non-reducing gas is used. Less amount of Fe3O4 is contained in respective samples H through J than in R through T. It is understood that this is caused by reducing Fe3O4 to FeO by the H2 in H through J.

Comparing H through J with R through T, it is understood that the amount of Fe3O4 in the magnetic film can be further increased when a non-reducing gas is used. This is clear also from the case comparing A through G (except C) with K through Q.

Influence of a Thermal Spraying Output

Comparing H with V, R with Z, G with X, and Q with β, it is understood that as a thermal spraying output is increased, the amount of $Fe_3O_4$ in the magnetic film can be further increased.

In U, W, Y, α, a porosity becomes high owing to low output of the thermal spraying, thus a hardness and an adhesiveness of the film are lowered.

Influence of Particle Size of Material Powder

Comparing H through J one another, and comparing R through T one another, it is understood that a particle size of the material powder influences little on a composition of the magnetic film, and a preferred particle size is in a range of 5–70 μm.

Figure 5:
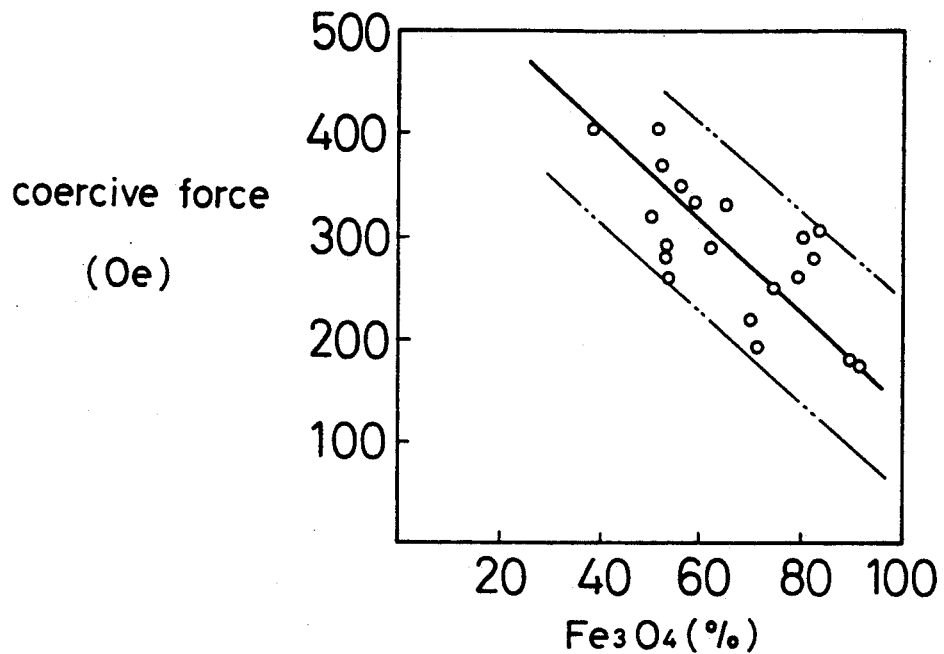
FIG. 5 is a diagram showing a relationship between an amount of $Fe_3O_4$ in the magnetic film and a coercive force Hc.

Relationship between the Amount of $Fe_3O_4$ in the Magnetic Film and the Coercive Force Hc As shown in FIG. 5, it is clear that as the amount of $Fe_3O_4$ in the magnetic film is increased, a coercive force Hc is reduced. Especially, if the amount of the $Fe_3O_4$ is at least 75 wt %, the coercive force Hc is in a range between 100 and 350 (Oe), an output at the time of recording can be comparatively low without erasing a recorded signal.

Figure 6:
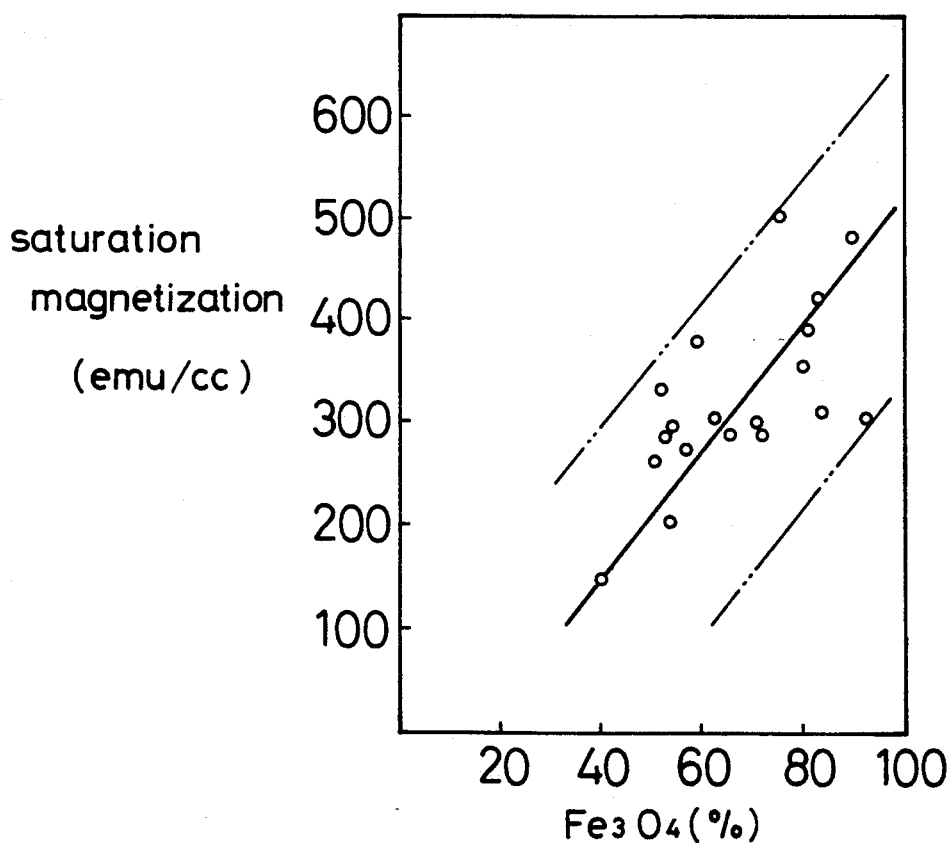
FIG. 6 is a diagram showing a relationship between an amount of $Fe_3O_4$ in the magnetic film and a saturation magnetization Ms.

Relationship between the Amount of $Fe_3O_4$ in the Magnetic Film and a Saturation Magnetization Ms As shown in FIG. 6, it is apparent that as the amount of $Fe_3O_4$ in the magnetic film is increased, a saturation magnetization Ms becomes comparatively high. Especially, if the amount of $Fe_3O_4$ is at least 75 wt %, the saturation magnetization Ms is in a range between 190 and 550 (emu/cc), and a regenerated output can be improved.

Figures 7, 8:
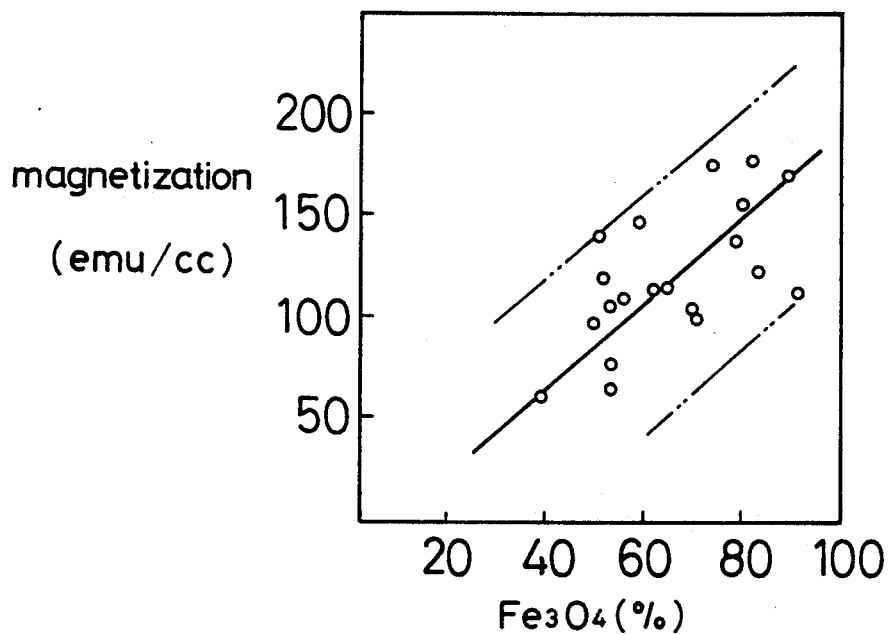
FIG. 7 is a diagram showing a relationship between an amount of $Fe_3O_4$ in the magnetic film and a residual magnetization Mr.
FIG. 8 is a diagram showing a relationship between an amount of $Fe_3O_4$ in the magnetic film and a regenerated output.

Relationship between the Amount of $Fe_3O_4$ and a Residual Magnetization Mr According to FIG. 7 it is apparent that as the amount of $Fe_3O_4$ is increased, a residual magnetization Mr is increased. Especially, if the amount of $Fe_3O_4$ is at least 75 wt %, the residual magnetization is in a range between 70 and 200 (emu/cc), and a regenerated output can be enhanced.

Relationship between the Amount of $Fe_3O_4$ in the Magnetic Film and a Regenerated Output As shown in FIG. 8, it is apparent that as the amount of $Fe_3O_4$ in the magnetic film is increased, a regenerated output is enhanced. Especially, the amount of $Fe_3O_4$ is at least 75 wt %, the regenerated output is at least 20 (V).

Figure 9:
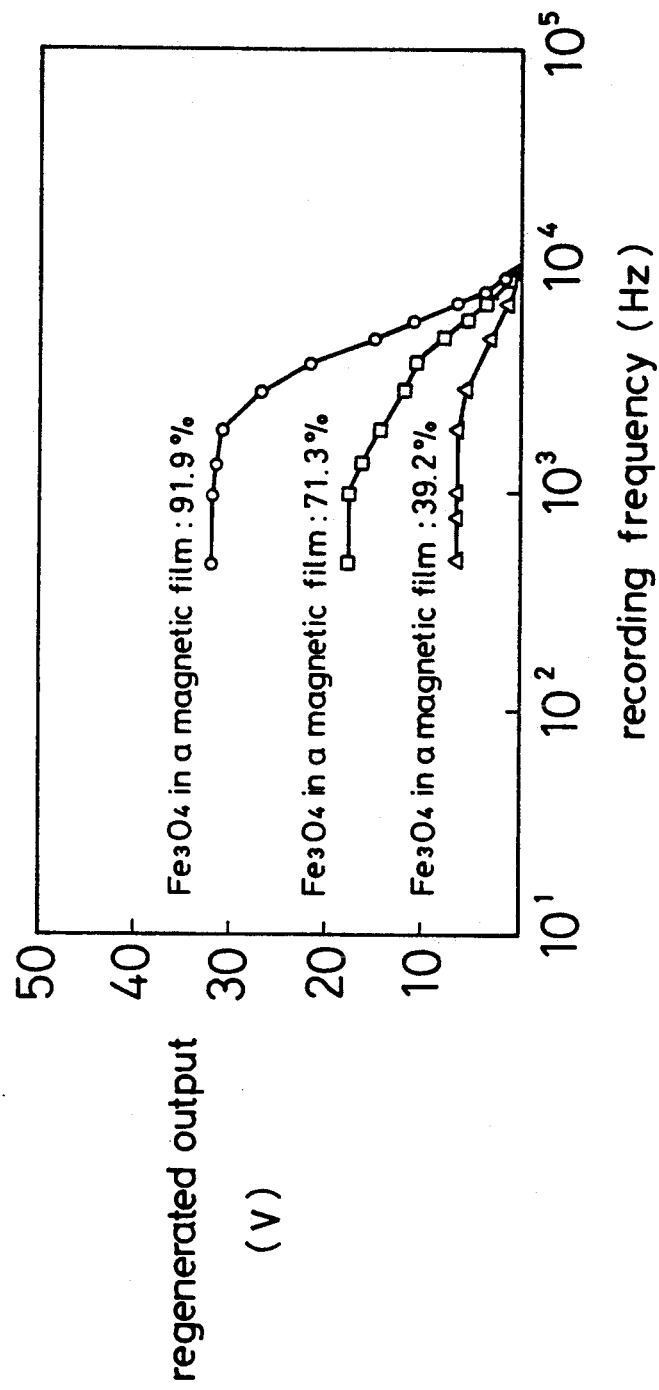
FIG. 9 is a diagram showing a relationship between an amount of $Fe_3O_4$ in the magnetic film and a recording frequency.

Generally, if the saturation magnetization or a residual magnetization is enhanced, a threshold recording frequency is lowered owing to lowering of a coercive force. However, as shown in FIG. 9, the threshold recording frequency is not lowered though $Fe_3O_4$ is increased so as to enhance the saturation magnetization, the residual magnetization and the regenerated output. This is because little coercive force is lowered and there is little self-demagnetizing loss which happens particularly at the time of recording a shortwave.

As many apparently widely different embodiments of this invention may be made without departing from the spirit and scope thereof, it is obvious that the invention is not limited to the specific embodiment thereof.

We claim:

1. A method for manufacturing a magnetic recording medium having a base piece and a magnetic film for recording a magnetic signal, said film being formed on the base piece by blasting a thermal spraying material by a plasma spraying by means of a plasma jet,
    wherein said thermal spraying material for the plasma spraying is an iron oxide powder consisting of FeO of at least 12.9 wt % and magnetic iron oxide of at least 50 wt %, and a working medium for the plasma spraying is a non-reducing gas.

2. A method for manufacturing a magnetic recording medium as defined in claim 1,
    wherein said non-reducing gas as the working medium for the plasma spraying is Ar.

3. A method for manufacturing a magnetic recording medium as defined in claim 1,
    wherein a spraying output for the plasma spraying is in a range from 30 to 48 kw.

4. A method of manufacturing a magnetic recording medium as defined in claim 1, wherein said magnetic iron oxide are $Fe_2O_3$ and $Fe_3O_4$.

5. A method for manufacturing a magnetic recording medium as defined in claim 4,
    wherein said non-reducing gas as the working medium for the plasma spraying is Ar.

6. A method for manufacturing a magnetic recording medium as defined in claim 1,
    wherein a spraying output for the plasma spraying is in a range from 30 to 48 kw.

* * * * *